United States Patent
Taniguchi

(10) Patent No.: US 8,475,964 B2
(45) Date of Patent: Jul. 2, 2013

(54) MEMBRANE-ELECTRODE ASSEMBLY, FUEL CELL, AND FUEL CELL SYSTEM

(75) Inventor: Takaaki Taniguchi, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 221 days.

(21) Appl. No.: 12/934,457

(22) PCT Filed: Mar. 23, 2009

(86) PCT No.: PCT/JP2009/001273
§ 371 (c)(1),
(2), (4) Date: Sep. 24, 2010

(87) PCT Pub. No.: WO2009/119062
PCT Pub. Date: Oct. 1, 2009

(65) Prior Publication Data
US 2011/0014543 A1 Jan. 20, 2011

(30) Foreign Application Priority Data
Mar. 24, 2008 (JP) .................. 2008-076832

(51) Int. Cl.
*H01M 8/06* (2006.01)

(52) U.S. Cl.
USPC ........... 429/413; 429/414; 429/450; 429/484; 429/523

(58) Field of Classification Search
USPC .................. 429/410, 413, 414, 450, 523, 535
See application file for complete search history.

(56) References Cited

U.S. PATENT DOCUMENTS

2009/0011311 A1* 1/2009 Alexandrovichserov et al. ............................. 429/30

FOREIGN PATENT DOCUMENTS

| CN | 1947289 A | 4/2007 |
|---|---|---|
| CN | 101093893 A | 12/2007 |
| EP | 1748509 A1 | 1/2007 |
| JP | 2002-203569 | 7/2002 |
| JP | 2002-270199 | 9/2002 |
| JP | 2004-071253 | 3/2004 |
| JP | 2006-228502 | 8/2006 |
| JP | 2007-123833 | 5/2007 |
| JP | 2007-141625 | 6/2007 |
| JP | 2007-220414 | 8/2007 |
| JP | 2009-080967 | 4/2009 |

OTHER PUBLICATIONS

International Preliminary Report on Patentability and Written Opinion of the International Searching Authority issued in International Patent Application No. PCT/JP2009/001273, mailed Nov. 18, 2010.
Chinese Office Action, and English translation thereof, issued in Chinese Patent Application No. 200980110093.0 mailed Aug. 24, 2012.

* cited by examiner

*Primary Examiner* — Patrick Ryan
*Assistant Examiner* — Ben Lewis
(74) *Attorney, Agent, or Firm* — McDermott Will & Emery LLP

(57) ABSTRACT

A membrane electrode assembly includes solid polymer electrolyte membrane, an anode, and cathode. The cathode has a stacked body formed of a catalyst layer and a gas diffusion layer. The catalyst layer, which contains catalyst metal-supporting carbon particles and an ion conductor, further contains a mesoporous humidity control agent whose amount of water adsorption rises steeply as a relative humidity increases in a specific relative humidity region.

5 Claims, 16 Drawing Sheets

MEMBRANE-ELECTRODE ASSEMBLY, FUEL CELL, AND FUEL CELL SYSTEM

RELATED APPLICATIONS

This application is the U.S. National Phase under 35 U.S.C. §371 of International Application No. PCT/JP2009/001273, filed on Mar. 23, 2009, which in turn claims the benefit of Japanese Application No. 2008-076832, filed on Mar. 24, 2008, the disclosures of which Applications are incorporated by reference herein.

TECHNICAL FIELD

The present invention relates to a fuel cell for generating electric power by an electrochemical reaction between hydrogen and oxygen.

BACKGROUND TECHNOLOGY

Recently much attention has been focused on fuel cells that feature not only high energy conversion efficiency but also no hazardous substance produced by the electricity-generating reaction. Known as one of such fuel cells is the polymer electrolyte fuel cell which operates at a low temperature of 100° C. or below.

A polymer electrolyte fuel cell, which has a basic structure of a solid polymer electrolyte membrane disposed between a fuel electrode and an air electrode, generates power through an electrochemical reaction as described below by supplying a fuel gas containing hydrogen to the fuel electrode and an oxidant gas containing oxygen to the air electrode.

Fuel electrode: $H_2 \rightarrow 2H^+ + 2e^-$     (1)

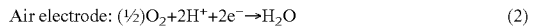

Air electrode: $(1/2)O_2 + 2H^+ + 2e^- \rightarrow H_2O$     (2)

The anode and the cathode have each a stacked structure of a catalyst layer and a gas diffusion layer. And a fuel cell is composed of catalyst layers of the respective electrodes disposed counter to each other in such a manner as to hold a solid polymer membrane therebetween. The catalyst layer is a layer of a catalyst or carbon particles carrying a catalyst bound together by an ion-exchange resin. The gas diffusion layer serves as a passage for the oxidant gas or the fuel gas.

At the anode, the hydrogen contained in the supplied fuel is decomposed into hydrogen ions and electrons as expressed in the above formula (1). Of them, the hydrogen ions travel inside the solid polymer electrolyte membrane toward the air electrode, whereas the electrons travel through an external circuit to the air electrode. At the cathode, on the other hand, the oxygen contained in the oxidant gas supplied thereto reacts with the hydrogen ions and electrons having come from the fuel electrode to produce water as expressed in the above formula (2). In this manner, the electrons travel from the fuel electrode toward the air electrode in the external circuit, so that the electric power is extracted therefrom (See Patent Document 1).

In order to simplify the polymer electrolyte fuel cell system for home use and reduce the cost thereof, a membrane electrode assembly (MEA), which is the power section of the fuel cell system, requires the robustness against the temperature fluctuations of the humidifying temperature and the cell temperature as well as the durability. In currently available MEA, the voltage also fluctuates when the humidifying temperature and/or the cell temperature fluctuate. Also, it is known that the rate of voltage drop is high relative to a conventional low-humidified continuous operation. As a way of addressing these problems, in Patent Document 2, a humidity control agent, such as mesoporous silica, is disposed in an interface between an electrolyte membrane and a catalyst layer and an interface between a catalyst layer and a gas diffusion layer, and is also disposed in layers outside the gas diffusion layer or the like. This humidity control agent keeps the interior of the fuel cell at a constant humidity and humidifies the solid polymer electrolyte membrane appropriately, so that a fuel cell, which does not require any auxiliary device, has been further conceived.

[Patent Document 1] Japanese Patent Publication No. 2002-203569.
[Patent Document 2] Japanese Patent Publication No. 2002-270199.

DISCLOSURE OF THE INVENTION

Problems to be Solved by the Invention

In the fuel cell cited in Patent Document 2, the humidity is adjusted in a location away from the catalyst layer where the actual reaction takes place. Thus the humidity control agent may not quickly suppress the temperature fluctuation inside the catalyst layer, for instance. Also, when the humidity control agent is inserted in layers, it must achieve a certain degree of electric conductivity since the humidity control agent is an insulating material. For this purpose, silver paste is mixed into the humidity control agent. In such a case, however, a problem arises where the gas diffusibility is hindered or the silver paste is eluted.

The present invention has been made in view of the foregoing problems, and a purpose thereof is to provide a technology capable of adjusting the humidity of a fuel cell without hindering the conductivity and gas diffusibility.

Means for Solving the Problems

One embodiment of the present invention relates to a membrane electrode assembly. The membrane electrode assembly comprises: an electrolyte membrane; an anode disposed on one face of the electrolyte membrane; and a cathode disposed on the other face of the electrolyte membrane, wherein at least either one of the anode and the cathode has a catalyst layer containing a mesoporous humidity control agent whose amount of water adsorption rises steeply as a relative humidity increases in a predetermined relative humidity region.

By employing this embodiment, if the catalyst layer locally transits to a dry state as a result of a temperature fluctuation or the like, the dry state can be prevented by abundantly releasing the water that the mesoporous humidity control agent near the ion conductor in the catalyst layer. Conversely, if the generated water is locally generated by power generation, the mesoporous humidity control agent prevents flooding by adsorbing the extra water generated. And the above-mentioned effects are further enhanced by adjusting the relative humidity range where the amount of water adsorption by the mesoporous humidity control agent changes steeply to the relative humidity range where a fuel cell is more likely to change due to temperature fluctuation.

In the above-described membrane electrode assembly, the mesoporous humidity control agent may be mesoporous silica. In such a case, an average pore diameter of the mesoporous silica may be 1 to 15 nm.

Also, in the above-described membrane electrode assembly, when a low-humidified reaction gas is supplied to the catalyst layer, the average pore diameter of a mesoporous silica added to an upstream side of the flow of the reaction gas may be smaller than the average pore diameter of a mesoporous silica added to a downstream side thereof (First Configuration).

Also, in the above-described membrane electrode assembly, a low-humidified reaction gas is supplied to the catalyst layer; the amount of a mesoporous silica, added to an upstream side of the flow of the reaction gas, relative to the catalyst layer on an upstream side may be larger than the amount of a mesoporous silica, added to a downstream side of the flow of the reaction gas, relative to the catalyst layer on a downstream side (Second Configuration).

Another embodiment of the present invention relates to a fuel cell. The fuel cell has a membrane electrode assembly according to any of the above-described embodiments.

Still another embodiment of the present invention relates to a fuel cell system. In the fuel cell system, at least one of a fuel gas and an oxidant is supplied to a fuel cell in a low-humidified state, and the fuel cell has a membrane electrode assembly described in the above First Configuration or Second Configuration. By employing this embodiment, a heat insulating member is simplified, a control unit is simplified, and so forth. Hence, the cost of the fuel cell system is reduced. Also, the fuel cell can be stably operated in the event that a temporary low-humidified state should occur due to the temperature fluctuation of the fuel cell.

It is to be noted that any arbitrary combinations or rearrangement, as appropriate, of the aforementioned constituting elements and so forth are all effective as and encompassed by the embodiments of the present invention.

Effect of the Invention

The present invention adjusts the humidity of a fuel cell without hindering the conductivity and gas diffusibility.

DESCRIPTION OF THE REFERENCE NUMERALS

Figure 1:
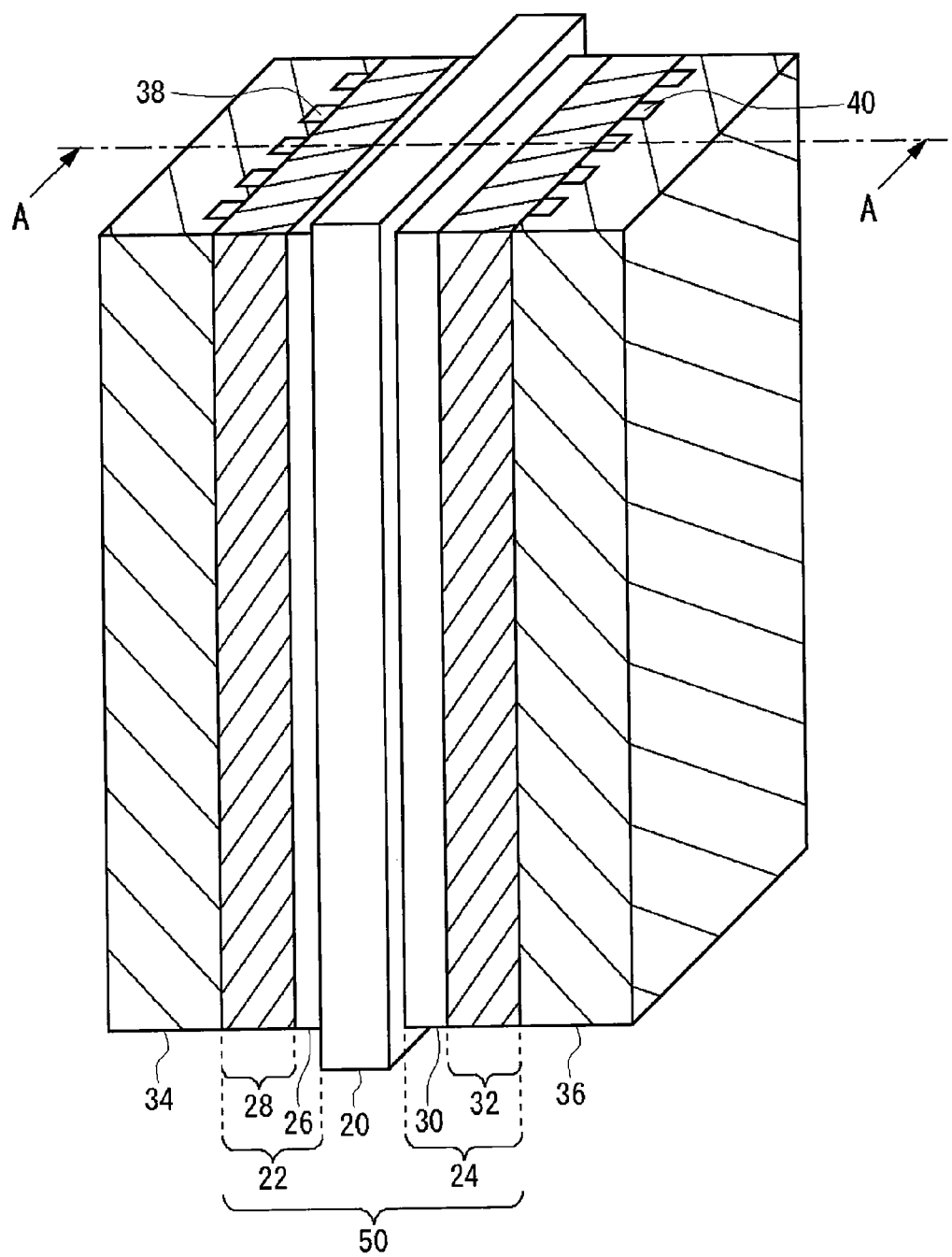
FIG. 1 is a perspective view schematically illustrating a structure of a fuel cell having an membrane electrode assembly according to an embodiment of the present invention.

10 Fuel cell
20 Solid polymer electrolyte membrane
22 Anode
24 Cathode
26, 30 Catalyst layers
28, 32 Gas diffusion layers
50 Membrane electrode assembly
100 Fuel cell system

BEST MODE FOR CARRYING OUT THE INVENTION

Hereinbelow, the embodiments will be described with reference to the accompanying drawings. Note that the identical components are given the identical reference numerals in all accompanying Figures and the repeated description thereof will be omitted as appropriate.

(Embodiment)

Figure 2:
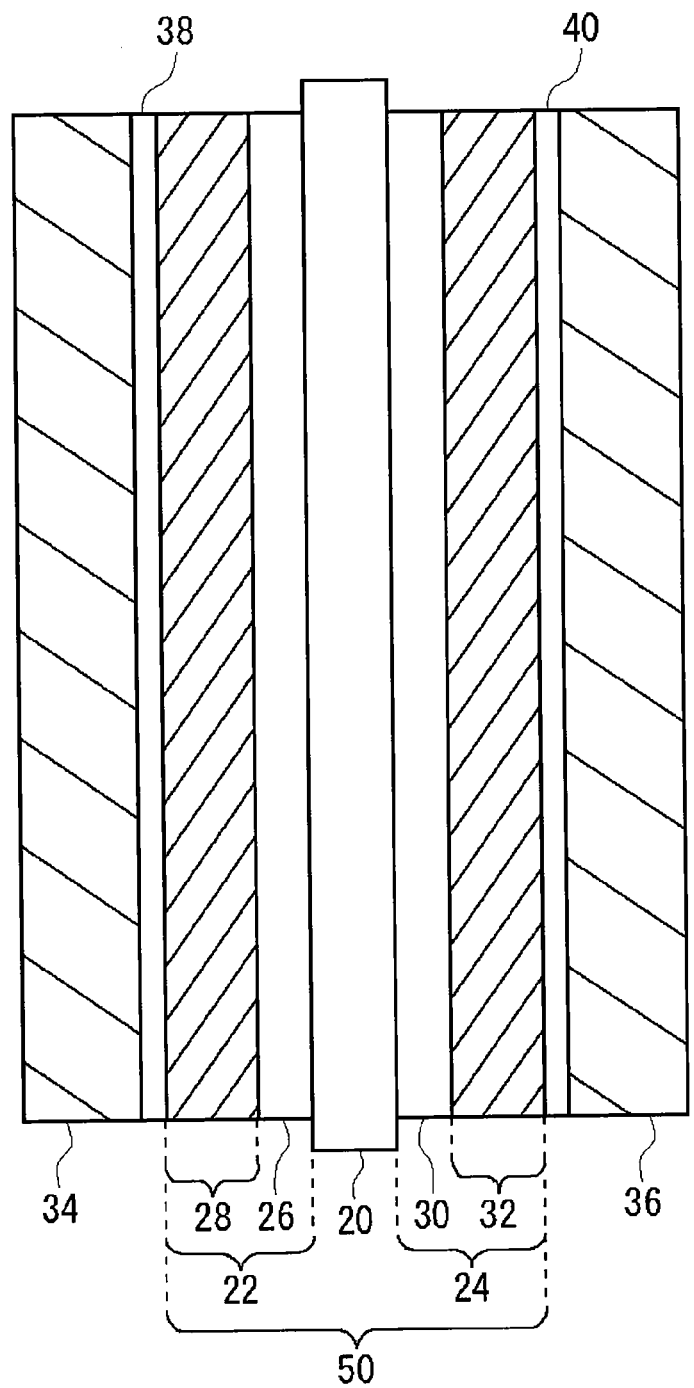
FIG. 2 is a cross-sectional view taken along the dotted line A-A of FIG. 1.

FIG. 1 is a perspective view schematically illustrating a structure of a fuel cell having a membrane electrode assembly according to an embodiment of the present invention. FIG. 2 is a cross-sectional view taken along the dotted line A-A of FIG. 1. The fuel cell 10 is comprised of a plate-like membrane electrode assembly 50, a separator 34 on one side of the membrane electrode assembly 50, and a separator 36 on the other side thereof. Although only one membrane electrode assembly 50 is shown in this example, the fuel cell 10 may be composed of a plurality of stacked membrane electrode assemblies 50 with separators 34 or separators 36 disposed therebetween. The membrane electrode assembly 50 includes a solid polymer electrolyte membrane 20, an anode 22, and a cathode 24.

The anode 22 has a stacked body comprised of a catalyst layer 26 and a gas diffusion layer 28. On the other hand, the cathode 24 has a stacked body comprised of a catalyst layer 30 and a gas diffusion layer 32. The catalyst layer 26 of the anode 22 and the catalyst layer 30 of the cathode 24 are disposed counter to each other with the solid polymer electrolyte membrane 20 held therebetween.

The separator 34 on the anode 22 side is provided with gas channels 38. From a manifold (not shown) for supplying fuel, the fuel gas is distributed to the gas channels 38 and supplied to the membrane electrode assembly 50 through the gas channels 38. Similarly, the separator 36 on the cathode 24 side is provided with gas channels 40.

From a manifold (not shown) for supplying an oxidant, the oxidant gas is distributed to the gas channels 40 and supplied to the membrane electrode assembly 50 through the gas channels 40. More specifically, when the fuel cell 10 is operating, the fuel gas is supplied to the anode 22 as a reformed gas, such as hydrogen gas, flows downward through the gas channels 38 along the surface of the gas diffusion layer 28.

At the same time, when the fuel cell 10 is operating, the oxidant gas, such as air, is supplied to the cathode 24 as the oxidant gas flows downward through the gas channels 40 along the surface of the gas diffusion layer 32. In this arrangement, a reaction occurs within the cell 50. That is, as the hydrogen gas is supplied to the catalyst layer 26 through the gas diffusion layer 28, the hydrogen in the gas is turned into protons, and the protons travel through the solid polymer electrolyte membrane 20 to the cathode 24 side. Electrons released at this time move to an external circuit and then flow into the cathode 24 from the external circuit. On the other hand, as air is supplied to the catalyst layer 30 through the gas diffusion layer 32, the oxygen combines with the protons, thus turning into water. As a result, electrons flow from the anode 22 to the cathode 24 in the external circuit, so that the electric power can be extracted therefrom.

The solid polymer electrolyte membrane 20, which displays an excellent ion conductivity in a damp condition, functions as an ion-exchange membrane that allows transfer of protons between the anode 22 and the cathode 24. The solid polymer electrolyte membrane 20 may be formed of a solid polymer material of fluorine-containing polymer or nonfluorine polymer, which may be, for example, a sulfonic acid type perfluorocarbon polymer, a polysulfone resin, or a perfluorocarbon polymer having a phosphonic acid group or carboxylic acid group. One example of a sulfonic acid type perfluorocarbon polymer is Nafion ionomer dispersion (made by DuPont: registered trademark) 112. Also, examples of non-fluorine polymer may be a sulfonated aromatic polyether ether ketone or polysulfone. The film thickness of the solid polymer electrolyte membrane 20 is typically 50 μm.

The catalyst layer 26 constituting a part of the anode 22 is comprised of an ion conductor (ion-exchange resin) and carbon particles supporting a catalyst, namely catalyst-supporting carbon particles. The thickness of the catalyst layer 26 is typically 20 μm. The ion conductor plays a role of connecting the carbon particles supporting an alloy catalyst with the solid polymer electrolyte membrane 20 to allow the transfer of protons between the two. The ion conductor may be formed of a polymer material similar to the solid polymer electrolyte membrane 20. Also, a water-repellent binder such as tetrafluoroethylene resin (polytetrafluoroethylene (PTFE)) may be added to the catalyst layer 26.

The alloy catalyst used for the catalyst layer 26 may be, for example, platinum and a precious metal. A precious metal used for the alloy catalyst may be, for example, ruthenium, palladium, or the like. Also, the carbon particles supporting such an alloy catalyst may be acetylene black, ketjen black, carbon nanotube, carbon nano-onion, or the like.

The gas diffusion layer 28 constituting another part of the anode 22 includes an anode gas diffusion substrate and a microporous layer applied to the anode gas diffusion substrate. Preferably, the anode gas diffusion substrate is made of a porous material having an electron conductivity, which may, for instance, be a carbon paper or woven or nonwoven cloth of carbon.

The microporous layer applied to the anode gas diffusion substrate is a pasty material derived by kneading an electrically conductive powder and a water repellent agent together. The electrically conductive powder may be carbon black, for instance. The water repellent agent that can be used may be a fluorine-based resin such as tetrafluoroethylene resin (polytetrafluoroethylene (PTFE)). Note that the water repellent agent preferably has a binding property. The binding property meant here is a property that can create a condition of cohesive bond of less viscous and easily crumbling materials together. With the cohesiveness of the water repellent agent, the electrically conductive powder and the water repellent agent can be kneaded together into a paste.

The catalyst layer 30 constituting a part of the cathode 24 is comprised of an ion conductor (ion-exchange resin) and carbon particles supporting a catalyst, namely catalyst-supporting carbon particles. The ion conductor plays a role of connecting the carbon particles supporting a catalyst with the solid polymer electrolyte membrane 20 to allow the transfer of protons between the two. The ion conductor may be formed of a polymer material similar to the solid polymer electrolyte membrane 20. The catalyst to be supported may be platinum or a platinum-alloy, for instance. A metal used for the platinum alloy may be, for example, cobalt, nickel, iron, manganese, iridium, and the like. Also, the carbon particles supporting such an catalyst may be acetylene black, ketjen black, carbon nanotube, carbon nano-onion, or the like.

The catalyst layer 30 contains a mesoporous humidity control agent. The mesoporous humidity control agent is characterized by its property of the amount of water adsorption steeply rising in a predetermined "relative humidity region" as the relative humidity rises. In other words, the mesoporous humidity control agent adsorbs surrounding water with a steep increase in the amount of water adsorption as the relative humidity rises in a predetermined "relative humidity region". Conversely, the mesoporous humidity control agent releases the water it has held with a steep decrease in the amount of water adsorption as the relative humidity drops in the predetermined relative humidity region.

When the catalyst layer 30 is about to locally shift to a dry state as a result of a temperature fluctuation or the like, the mesoporous humidity control agent near the ion conductor in the catalyst layer 30 can prevent the dry state by abundantly releasing the water it has adsorbed. Conversely, the mesoporous humidity control agent which has released water resumes absorbing water in a wet state, so that it can keep a constantly wet ambience for the catalyst layer 30.

The mesoporous humidity control agent that can be used appropriately is mesoporous silica. More specifically, TMPS (registered trademark) made by Taiyo Kagaku Co., Ltd. can be used as the mesoporous silica. TMPS, which is synthesized with surfactant micelles as a template, is a silica mesoporous material (mesoporous silica) having mesopores of a uniform honeycomb structure. Mesopores are fine pores of 2 to 50 nm in pore diameter. It should be appreciated, however, that mesopores are of larger pore diameter than the conventional zeolite (pore diameter: smaller than 1 nm). TMPS features a large specific surface area of up to 1500 $m^2/g$ and a pore volume of about 1 $cm^3/g$.

Figure 3:
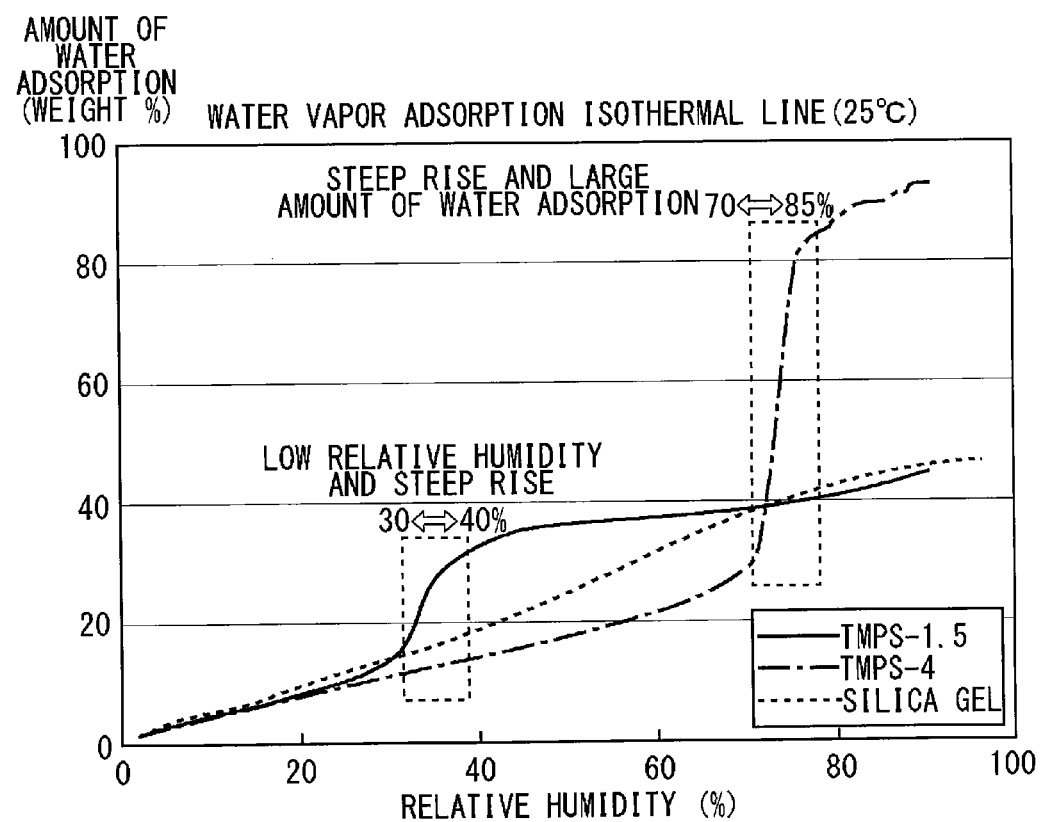
FIG. 3 is a graph showing a relationship between the amount of water adsorption and relative humidity of mesoporous silica and ordinary silica gel.

FIG. 3 is a graph showing a relationship between the amount of water adsorption and relative humidity of mesoporous silica and ordinary silica gel. In FIG. 3, shown as examples of mesoporous silica are TMPS-1.5 whose average pore diameter is 1.5 nm and TMPS-4 whose average pore diameter is 4.0 nm. As is evident in FIG. 3, mesoporous silica shows a steep change in the amount of water adsorption in a predetermined relative humidity region as compared with ordinary silica gel. This phenomenon is presumed attributable to the fact that mesoporous silica has fine pores of uniform size. To be more precise, TMPS-1.5 shows a steep rise in the amount of water adsorption as the relative humidity increases within the relative humidity range of 30 to 40%. Also, TMPS-4 shows a steep rise in the amount of water adsorption as the relative humidity increases within the relative humidity range of 70 to 85%. The steep rise in the amount of water adsorption like this is a characteristic which is not found with silica gel. Thus, mesoporous silica has greater humidity control effects than silica gel. Also, mesoporous silica allows the adjustment of the relative humidity range where the amount of water adsorption rises steeply by changing the average pore diameter. Also, mesoporous silica, when used as a humidity control agent, requires no paste material, so that there will be no great effects of eluted substance. As a result, the problem of insulation properties can be resolved by adjusting the amount of mesoporous silica to be added.

It is desirable that the amount of mesoporous silica to be added and the pore diameter thereof be adjusted according to the state of power generation by the fuel cell. For example, let us assume that a fuel cell system is operating at the cell temperature of 80° C. and the humidified gas temperature fluctuating between 71 and 76° C. and that a current density of 0.3 A/cm$^2$ is employed. Then the relative humidity within the cell will be 70 to 100% for the humidifying temperature of 71° C. or 85 to 100% for the humidifying temperature of 76° C. In such a case, it is desirable that a mesoporous silica with the average pore diameter of 4.0 nm (TMPS-4 made by Taiyo Kagaku Co., Ltd.) as shown in FIG. 3 be added to the catalyst layer.

In consideration of the water production per unit area and the water vapor supplied from outside being about 4 mg/min/cm$^2$ for the humidifying temperature of 71° C., the amount of mesoporous silica to be added is preferably 1 to 480 mg/cm$^2$ and more preferably 40 to 240 mg/cm$^2$.

Also, the average particle diameter of mesoporous silica is preferably 15 nm to 10 μm when the thickness of the catalyst layer 30 is 20 to 100 μm, and it is preferably 15 nm to 1 μm when the thickness of the catalyst layer 30 is less than 20 μm. The range of preferable particle diameter varies with the pore diameter of mesoporous silica. For mesoporous silica having an average pore diameter of 1.5 nm, the average particle diameter is preferably 15 to 150 nm. Also, for mesoporous silica having an average pore diameter of 4 nm, the average particle diameter is preferably 40 to 400 nm. The mesoporous silica having an average pore diameter of about several tens of nm can be manufactured by a method as disclosed in Japanese Patent Application Publication No. 2006-069824.

The gas diffusion layer 32 constituting a part of the cathode 24 includes a cathode gas diffusion substrate and a microporous layer applied to the cathode gas diffusion substrate. The cathode gas diffusion substrate is preferably made of a porous material having an electron conductivity, which may be a carbon paper or woven or nonwoven cloth of carbon, for instance.

The microporous layer applied to the cathode gas diffusion substrate is a pasty material derived by kneading an electrically conductive powder and a water repellent together. As for the electrically conductive powder, carbon black may be used, for instance. Also, the water repellent agent that can be used may be a fluorine-based resin such as tetrafluoroethylene resin (polytetrafluoroethylene). Note that the water repellent preferably has a binding property. The cohesiveness of the water repellent allows the electrically conductive powder and the water repellent to be kneaded together into a paste.

In the membrane electrode assembly 50 or the fuel cell 10 as described above, if the catalyst layer 30 is locally shifting to a dry state as a result of a temperature fluctuation or the like, the mesoporous humidity control agent near the ion conductor in the catalyst layer 30 can prevent the dry state by abundantly releasing the water it has adsorbed. Conversely, if there occurs water locally generated by power generation, the mesoporous humidity control agent prevents flooding by adsorbing the extra water generated. And the above-mentioned effects are further enhanced by adjusting the relative humidity range where the amount of water adsorption by the mesoporous humidity control agent changes steeply to the relative humidity range where the fuel cell 10 is more likely to change due to temperature fluctuation.

Note that in the embodiment described above, the mesoporous humidity control agent is added only to the catalyst layer 30 constituting a part of the cathode 24. However, the mesoporous humidity control agent may be added only to the catalyst layer 26 constituting a part of the anode 22, or the mesoporous humidity control agent may be added to both the catalyst layer 30 constituting a part of the cathode 24 and the catalyst layer 26 constituting a part of the anode 22.

(Fabrication Method of Membrane Electrode Assembly)

Here a description will be given of a method for manufacturing a membrane electrode assembly according to the present embodiment. The following description of the manufacturing method exemplifies an arrangement in which mesoporous silica as the mesoporous humidity control agent is added to both the catalyst layer 30 of the cathode 24 and the catalyst layer 26 of the anode 22.

<Fabrication Method of Cathode Catalyst Slurry>

Platinum-supporting carbon (TEC10E50E made by Tanaka Kikinzoku Kogyo Co., Ltd.) is used as the cathode catalyst, and a Nafion (registered trademark) dispersion solution (DE2021, 20% by mass) as the ion conductor. After 10 mL of superpure water is added to 5 g of platinum-supporting carbon and stirred, 15 mL of ethanol and mesoporous silica are added. The amount of mesoporous silica to be added and the pore diameter thereof are adjusted according to the state of power generation by the fuel cell.

This catalyst dispersing solution is subjected to one hour of ultrasonic stirring and dispersion using an ultrasonic stirrer. A predetermined amount of the Nafion solution is diluted by an equal amount of ultrapure water and stirred for three minutes with a glass rod. After that, an ultrasonic dispersion is performed for one hour using an ultrasonic cleaner to obtain an aqueous solution of Nafion. Then the aqueous solution of Nafion is slowly added in drops into the catalyst dispersing solution. During the dripping, stirring is performed continuously, using the ultrasonic stirrer. Upon completion of the dripping of the aqueous solution of Nafion, 10 g (ratio by weight being 1:1) of a mixed solution of 1-propanol and 1-butanol is added in drops to obtain a solution which is used as the catalyst slurry. During this mixing process, adjustments are made to keep the water temperature at about 60° C. so as to remove ethanol by evaporation.

<Fabrication of Cathode>

The catalyst slurry made by the above-described method is applied by screen printing (150 meshes) to a gas diffusion layer with a microporous layer made of Vulcan XC 72, and then the catalyst slurry applied thereto is subjected to three hours of drying at a temperature of 80° C. and forty five minutes of heat treatment at 180° C.

<Fabrication of Anode Catalyst Slurry>

The method for manufacturing a catalyst slurry for the anode catalyst layer is the same as the method for manufacturing a cathode catalyst slurry except that the catalyst to be used is platinum-ruthenium supporting carbon (TEC61E50E made by Tanaka Kikinzoku Kogyo Co., Ltd.). Nafion ionomer dispersion is used as the ion conductor.

<Fabrication of Anode>

The anode catalyst slurry made by the above-described method is applied in order by screen printing (150 mesh) to a gas diffusion layer with a microporous layer made of Vulcan XC 72. Then the catalyst slurry applied thereto is subjected to three hours of drying at a temperature of 80° C. and forty five minutes of heat treatment at 180° C.

<Fabrication of Membrane Electrode Assembly>

A hot pressing is performed on a solid polymer electrolyte membrane held between an anode and a cathode made by the above-described methods. Nafion ionomer dispersion is used as the solid polymer electrolyte membrane. A membrane electrode assembly is made by a hot pressing of the anode, the solid polymer electrolyte membrane, and the cathode under the joining conditions of 170° C. and 200 seconds.

(Example Embodiment 1)

A membrane electrode assembly according to a first example embodiment was made by the above-described method for manufacturing a membrane electrode assembly. The mesoporous silica used was TMPS-4-1, as shown in FIG. 3, whose average pore diameter was 4.0 nm and average particle diameter was 3.0 μm. The amount of mesoporous silica added was 120 mg/cm$^2$. Using a membrane electrode assembly according to the first example embodiment, a temperature fluctuation endurance test was conducted on a single cell of 25 cm$^2$. The conditions for power generation were as follows.

Current density: 0.3 A/cm$^2$
Anode gas: Hydrogen
Cathode gas: Air
Fuel utilization: 75%
Air utilization: 55%

Figure 11:
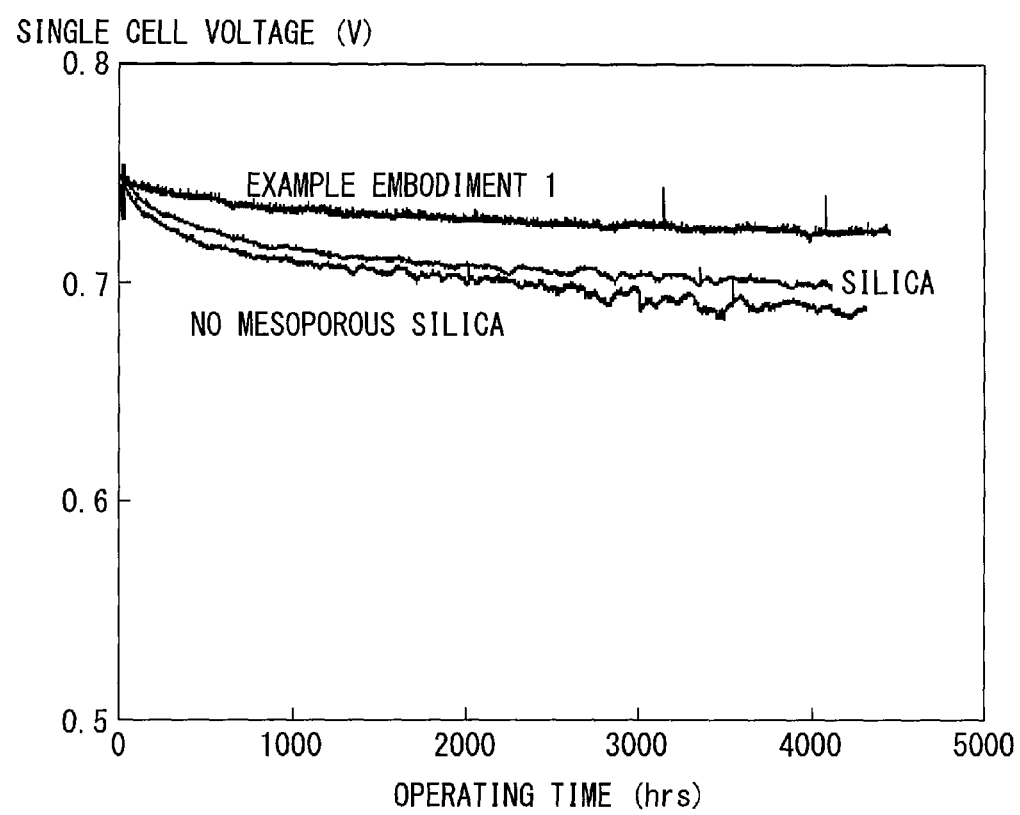
FIG. 11 is a graph showing a change in the value of single-cell voltage over operating hours, in a first example embodiment.

For a cell temperature of 80° C., the humidifying temperature was changed in cycles of about one hour each between 71° C. and 76° C. for both the anode and the cathode. The cell voltage values (V) found in the endurance test of 4000 hours are shown in Table 1 and FIG. 11. The cell with mesoporous silica added shows a voltage drop of 0.042 V after 4000 hours, in contrast to a voltage drop of 0.066 V after 4000 hours of the cell with no mesoporous silica added. Therefore, it has been confirmed that the voltage drop is reduced in this example embodiment. Also, for comparison, a cell with the same amount of silica particles (HPS-1000 made by Toagosei Company, Limited, average particle diameter: 1.5 μm) added (additive amount: 120 mg/cm$^2$) was tested. In this case, too, the voltage drop after 4000 hours was 0.057 V, which indicated superiority of mesoporous silica at times of voltage fluctuation and voltage drop.

TABLE 1

|  | No addition | Mesoporous silica added | Silica added |
|---|---|---|---|
| 0 hr | 0.756 | 0.763 | 0.756 |
| 4000 hrs | 0.690 | 0.721 | 0.699 |
| Voltage drop | 0.066 | 0.042 | 0.057 |

(Example Embodiment 2)

A membrane electrode assembly according to a second example embodiment was made by the above-described method for manufacturing a membrane electrode assembly. Under the humidifying conditions of 53 to 60° C. for both the anode gas and cathode gas, which are extremely low humidifying conditions, the relative humidity within the cell is within a range of 30 to 100% RH for the humidifying temperature of 53° C. and within a range of 42 to 100% RH for the humidifying temperature of 60° C. Accordingly, in this example embodiment, the mesoporous humidity control agent used as one suited to the extremely low humidifying conditions was a mixture of the mesoporous silica (TMPS-1.5-1 made by Taiyo Kagaku Co., Ltd.) whose average pore diameter was 1.5 nm and the mesoporous silica (TMPS-4-1 made by Taiyo Kagaku Co., Ltd.) whose average pore diameter was 4.0 nm (see FIG. 3). The mesoporous silica used in the second example embodiment was such that the particle diameter of TMPS-1.5-1 was 2 μm and the particle diameter of TMPS-4-1 was 3 μm. The amount of the mesoporous silica added was 60 mg/cm$^2$ for each of TMPS-1.5-1 and TMPS-4-1, and a total of 120 mg/cm$^2$.

Using a membrane electrode assembly according to the second example embodiment, a temperature fluctuation endurance test was conducted on a single cell of 25 cm$^2$. The conditions for power generation were as follows.

Current density: 0.3 A/cm$^2$
Anode gas: Hydrogen
Cathode gas: Air
Fuel utilization: 75%
Air utilization: 55%

Figure 12:
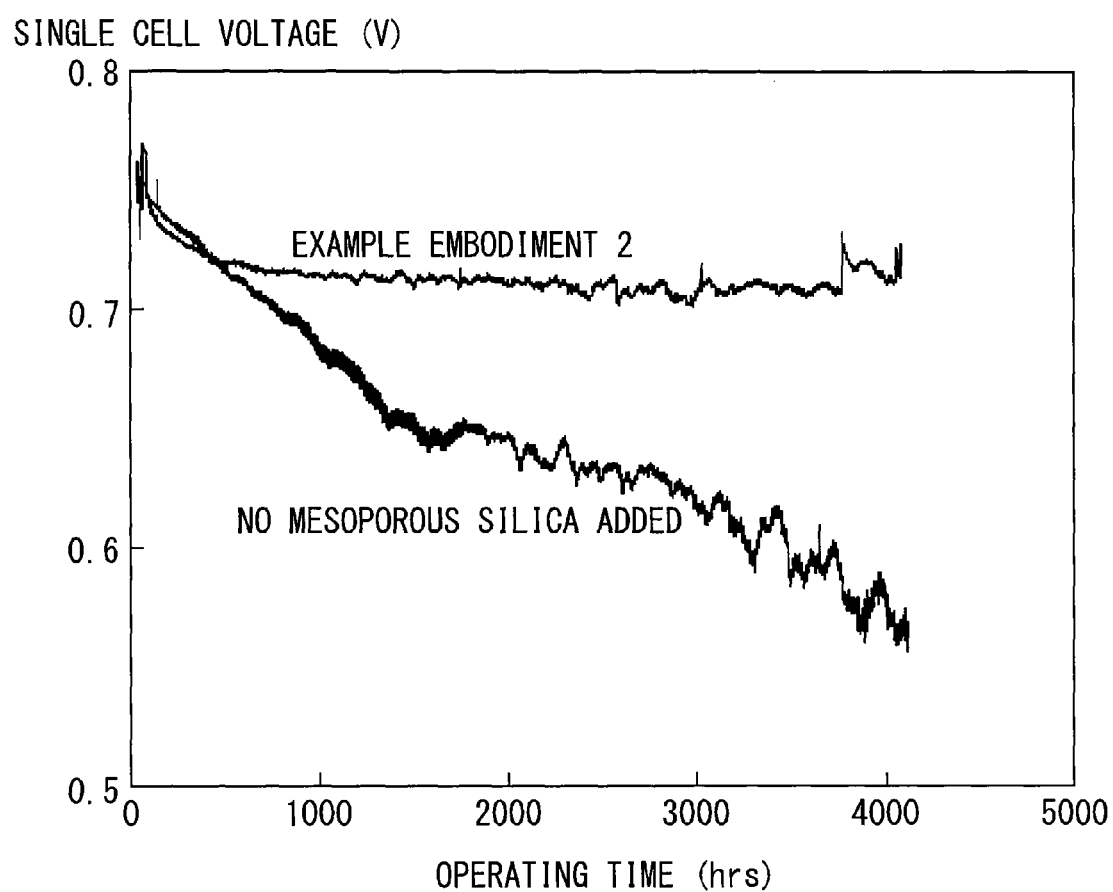
FIG. 12 is a graph showing a change in the value of single-cell voltage over operating hours, in a second example embodiment.

For a cell temperature of 80° C., the humidifying temperature was changed in cycles of about one hour each between 53° C. and 60° C. for both the anode and the cathode. The cell voltage values (V) found in the endurance test of 4000 hours are shown in Table 2 and FIG. 12. The cell with mesoporous silica added shows a voltage drop of 0.049 V after 4000 hours, in contrast to a voltage drop of 0.189 V after 4000 hours of the cell with no mesoporous silica added. Therefore, it has been confirmed that the voltage drop is reduced in this example embodiment.

TABLE 2

|  | No addition | Mesoporous silica added |
|---|---|---|
| 0 hr | 0.756 | 0.761 |
| 4000 hrs | 0.567 | 0.712 |
| Voltage drop | 0.189 | 0.049 |

Note that a mixture of TMPS-1.5 and TMPS-4 was used in the second example embodiment, but use of TMPS-1.5 only may also provide the same advantageous effects. Mesoporous silica is characterized in that the larger the pore diameter is, the higher the region tends to be where the corresponding amount of water adsorption changes drastically. Therefore, it is possible to design the humidity control material such that it meets the conditions of cell temperature and humidifying temperature fluctuation.

(Example Embodiment 3)

Figure 4:
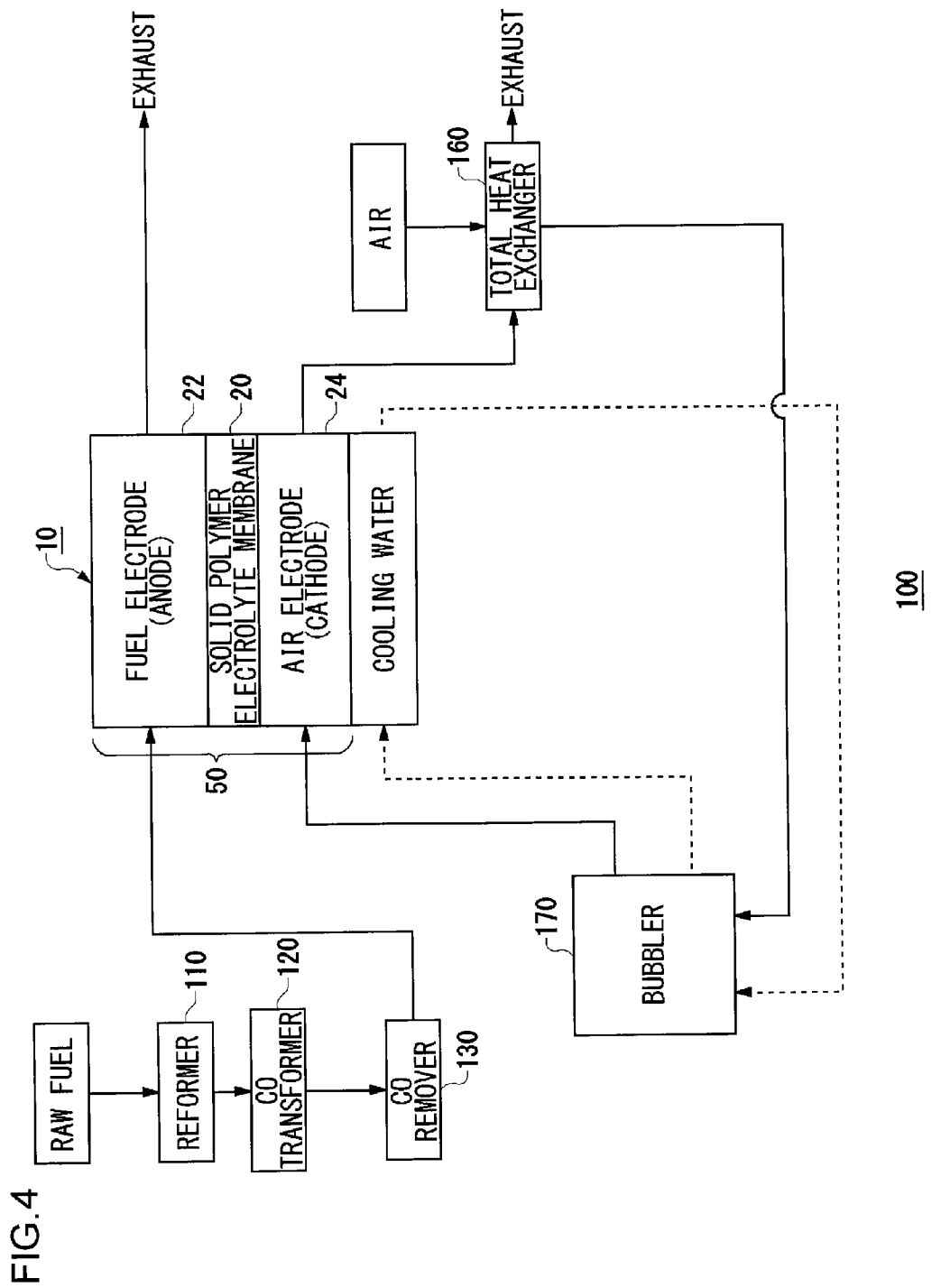
FIG. 4 is a diagram showing a schema of a fuel cell system using a membrane electrode assembly according to a third example embodiment.

FIG. 4 is a diagram showing a schema of a fuel cell system using a membrane electrode assembly according to a third example embodiment.

A hydrocarbon-based gas, such as natural gas or LPG, is supplied to a reformer 110 as a raw fuel for reforming. Also supplied to the reformer 110 are a water-treated clean water as reforming water and air from the outside. The reformer 110 performs a steam reforming of the raw fuel using the reforming water, thereby generating a reformed gas rich in hydrogen gas.

The reformed gas generated by the reformer 110 is supplied to a CO transformer 120, where CO is transformed into hydrogen by a shift reaction. This will reduce the CO concentration to 0.5% or below. Further, at a CO remover 130, the CO concentration is reduced to about 10 ppm through a CO oxidation reaction using a CO selective removal catalyst. The reformed gas whose CO concentration has been reduced by the CO remover 130 is supplied to the anode 22 as fuel gas and used for power generation by the fuel cell 10. In the third example embodiment, therefore, the reformed gas is supplied to the fuel cell 10 without passing through a bubbler.

On the other hand, the air to be used as an oxidant is humidified and heated at a total heat exchanger 160 where air undergoes a heat exchange with reacted air discharged from the cathode 24, before it is supplied to a bubbler 170. The bubbler 170 humidifies the air to a predetermined humidity. The air humidified by the bubbler 170 is supplied to the cathode 24 and used in an electrochemical reaction with hydrogen contained in the reformed gas. The reacted air is subjected to a heat exchange with unreacted air in the total heat exchanger 160 before it is released outside.

Each cell of the fuel cell 10 is cooled by a cooling water. In the third example embodiment, part of the humidifying water in the bubbler 170 is supplied as cooling water to the fuel cell 10. The cooling water used in cooling each cell of the fuel cell 10 is sent back to the bubble 170, where the cooling water is used in heat exchange with the air.

In the fuel cell system as shown in FIG. 4, the reformed gas was supplied at a steam/carbon ratio (S/C ratio) of 2.7 and a stable-state humidification at 56° C. Yet, in actual operations, the temperature of the reformed gas fluctuated within a range of 51 to 60° C. because there were variations in the gas supply pressure. In the third example embodiment, where the cell temperature was determined to be 80° C. (defined by the cooling water entrance temperature at the stack), the relative humidity of an anode inlet gas changed between 24% and 42%. The temperature of the air, which is 5 to 0° C. below the cell temperature, was 75 to 80° C., and the relative humidity of the air was 81 to 100%. Since the cooling water goes through a heat exchange at the bubbler 170, the cell temperature has a positive correlation with the tank temperature of the bubbler 170.

Figure 5:
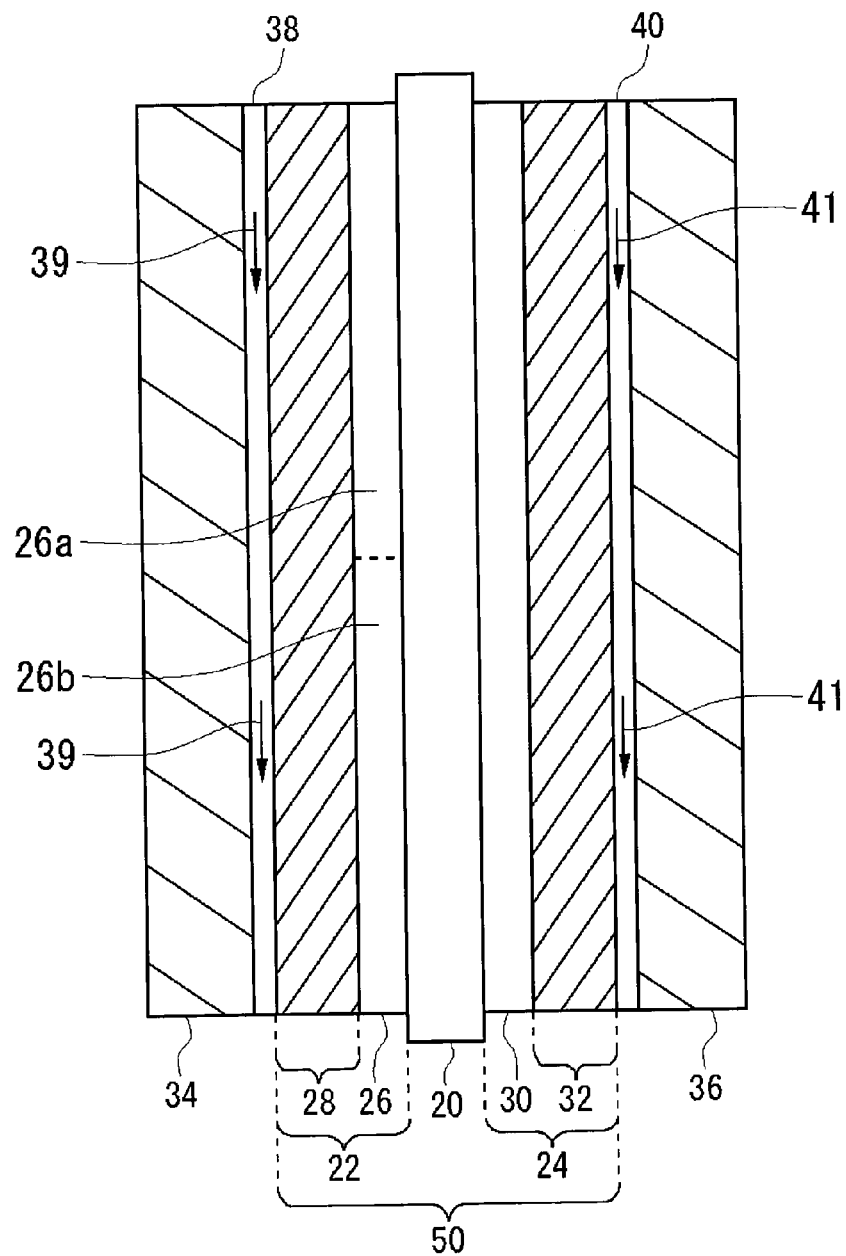
FIG. 5 is a cross-sectional view of a fuel cell having a membrane electrode assembly according to a third example embodiment.

FIG. 5 is a cross-sectional view of a fuel cell 10 having a membrane electrode assembly 50 according to the third example embodiment. The reformed gas flows through gas channels 38 in the direction of arrows 39. Air flows through gas channels 40 in the direction of arrows 41. In the third example embodiment, mesoporous silica (TMPS-1.5-2) whose average pore diameter is 1.5 nm was added to a catalyst layer 26a, of the catalyst layer 26 in the anode 22, located in a region corresponding to an upper-half (50%) flow of the reformed gas on an inlet side (upstream side) thereof. Also, mesoporous silica (TMPS-4-2) whose average pore diameter is 4.0 nm was added to a catalyst layer 26b, of the catalyst layer 26 in the anode 22, located in a region corresponding to a lower-half (50%) flow of the reformed gas on an outlet side (downstream side) thereof. No mesoporous silica is added to the catalyst layer 30 of the cathode 24. The particle diameters of TMPS-1.5-2 and TMPS-4-2 used in the third example embodiment are 150 nm and 400 nm, respectively. The amount of TMPS-1.5-2 added was 5 wt. % of the total amount of catalyst, catalyst support and ion conductor of the catalyst layer 26a. Similarly, the amount of TMPS-4-2 added was 5 wt. % of the total amount of catalyst, catalyst support and ion conductor of the catalyst layer 26b.

Figure 13:
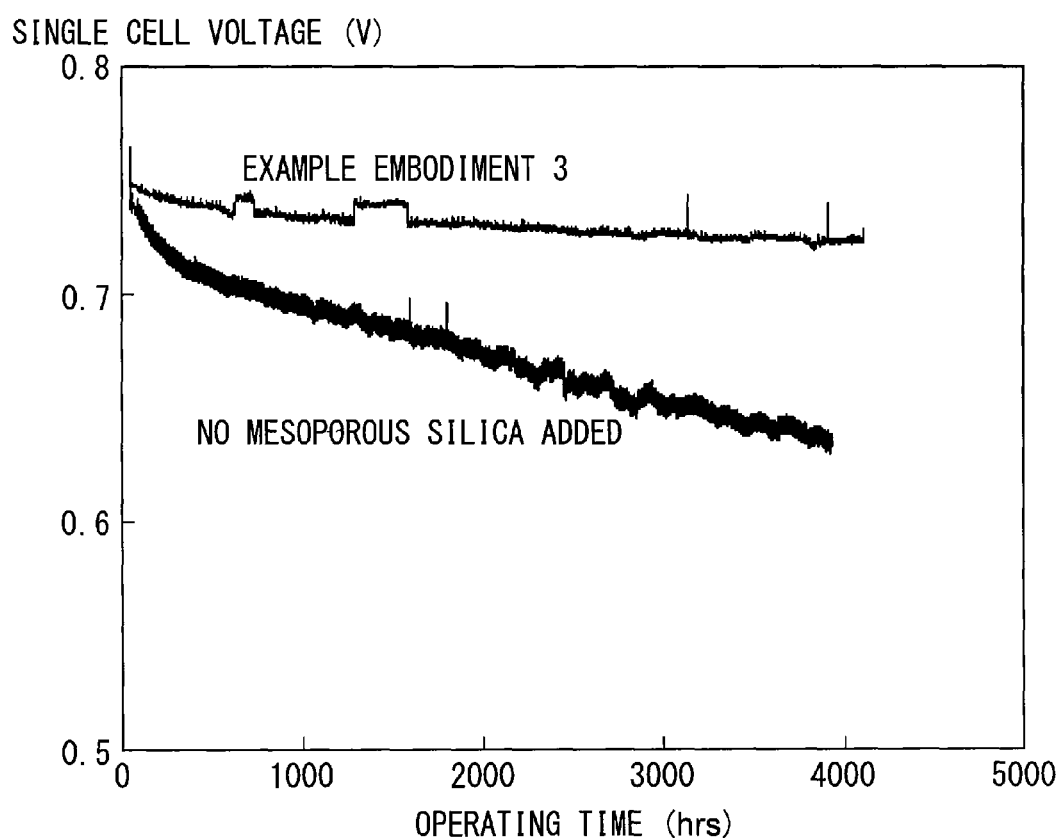
FIG. 13 is a graph showing a change in the value of single-cell voltage over operating hours, in a third example embodiment.

The cell voltage values (V) found in the endurance test of 4000 hours are shown in Table 3 and FIG. 13. The cell with mesoporous silica added shows a voltage drop of 0.042 V after 4000 hours, in contrast to a voltage drop of 0.129 V after 4000 hours of the cell with no mesoporous silica added. Therefore, it has been confirmed in this example embodiment that the voltage drop is reduced and that the voltage characteristics and the stability of voltage fluctuation are improved.

TABLE 3

|  | No addition | Mesoporous silica added |
|---|---|---|
| 0 hr | 0.763 | 0.765 |
| 4000 hrs | 0.634 | 0.723 |
| Voltage drop | 0.129 | 0.042 |

It is presumed that such advantageous effects as described above are caused by the following mechanism. That is, as shown in FIG. 3, when the relative humidity changes from 40% to 30% due to the temperature fluctuation, TMPS-1.5 rapidly releases the water it has held. This humidifies the solid polymer electrolyte membrane 20 and prevents the degradation of the transfer of protons. On the other hand, when the humidifying temperature rises due to the temperature fluctuation, TMPS-1.5 holds the water. Also, TMPS-4 has the property such that it rapidly adsorbs the water when the relative humidity changes from 70% to 85%. For the reformed gas whose relative humidity was 24% to 40% on an inlet side of the gas channels 38, the humidifying temperature rises because of the generated water due to the reaction and the reformed gas is of high humidity as it approaches an outlet side of the gas channels 38. Therefore, TMPS-4 whose average pore diameter is 4.0 nm, instead of TMPS-1.5 whose average pore diameter is 1.5 nm, is added in the catalyst layer 26b, so that the membrane electrode assembly 50 coping with the fluctuation of the humidifying temperature in a downstream side of the gas channel 38 can be obtained.

The fuel cell system according to the third example embodiment described as above uses the membrane electrode assembly 50 which has coped with and resolved the temperature fluctuation problem. Thus, the fuel cell 10 can be stably operated without the use of the bubbler or the like for humidifying the reformed gas supplied to the anode 22. Hence, the cost of the fuel cell system 100 can be reduced.

(Example Embodiment 4)

Figure 6:
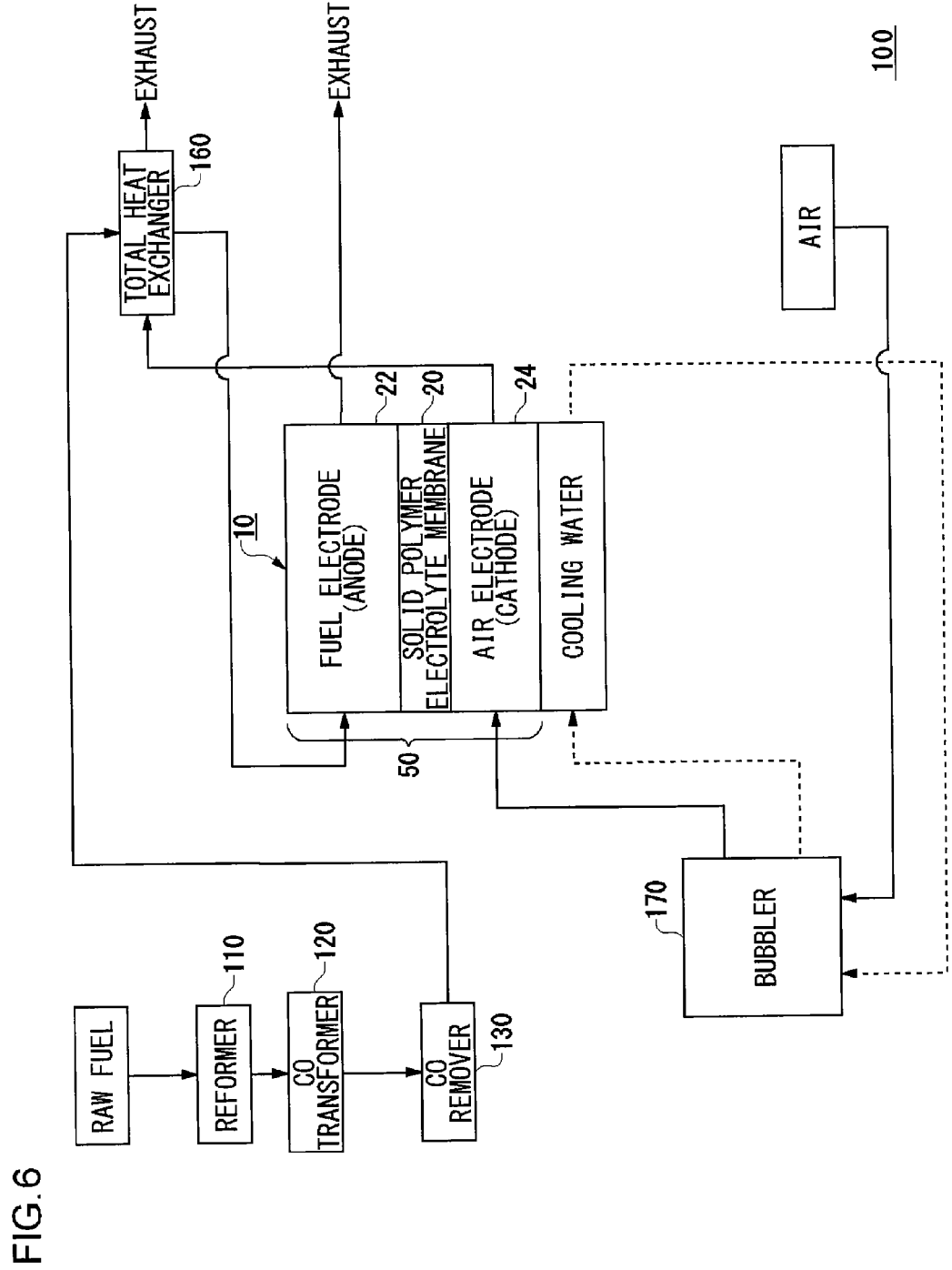
FIG. 6 is a diagram showing a schema of a fuel cell system using a membrane electrode assembly according to a fourth example embodiment.

FIG. 6 is a diagram showing a schema of a fuel cell system 100 using a membrane electrode assembly 50 according to a fourth example embodiment.

In the fourth example embodiment, the reformed gas generated in the CO reformer 130 is humidified and heated at the total heat exchanger 160 where the gas undergoes a heat exchange with the reacted air discharged from the cathode 24, before it is supplied to the anode 22. At the same time, air is directly supplied to the bubbler 170 without passing through the total heat exchanger 160. The air humidified by the bubbler 170 is supplied to the cathode 24 and used in an electrochemical reaction with hydrogen contained in the reformed gas. The reacted air is subjected to a heat exchange with unreacted air in the total heat exchanger 160 before it is released outside.

In the fuel cell system 100 of the fourth example embodiment, the humidifying temperature of the reformed gas is 2 to 10° C. below the cell temperature. In the fourth example embodiment, the fuel cell 10 is operated at the cell temperature of 80° C., so that the humidifying temperature of the reformed gas is 70 to 80° C. and the reformed gas whose relative humidity is 66 to 92% is supplied to the anode 22. Since the humidifying temperature of the air supplied to the cathode 24 is 5 to 0° C. below the cell temperature, the humidifying temperature of the air is 75 to 80° C. and the air whose relative humidity is 81 to 100% is supplied to the cathode 24.

In the fourth example embodiment, mesoporous silica (TMPS-4-2, the average particle diameter: 400 nm) was added to a catalyst layer 26*a* as shown in FIG. 5, and no mesoporous silica was added to the catalyst layer 26*b*. No mesoporous silica was added to the catalyst layer 30 of the cathode 24, either. The amount of TMPS-4-2 added was 5 wt. % of the total amount of catalyst, catalyst support and ion conductor of the catalyst layer 26*a*.

Figure 14:
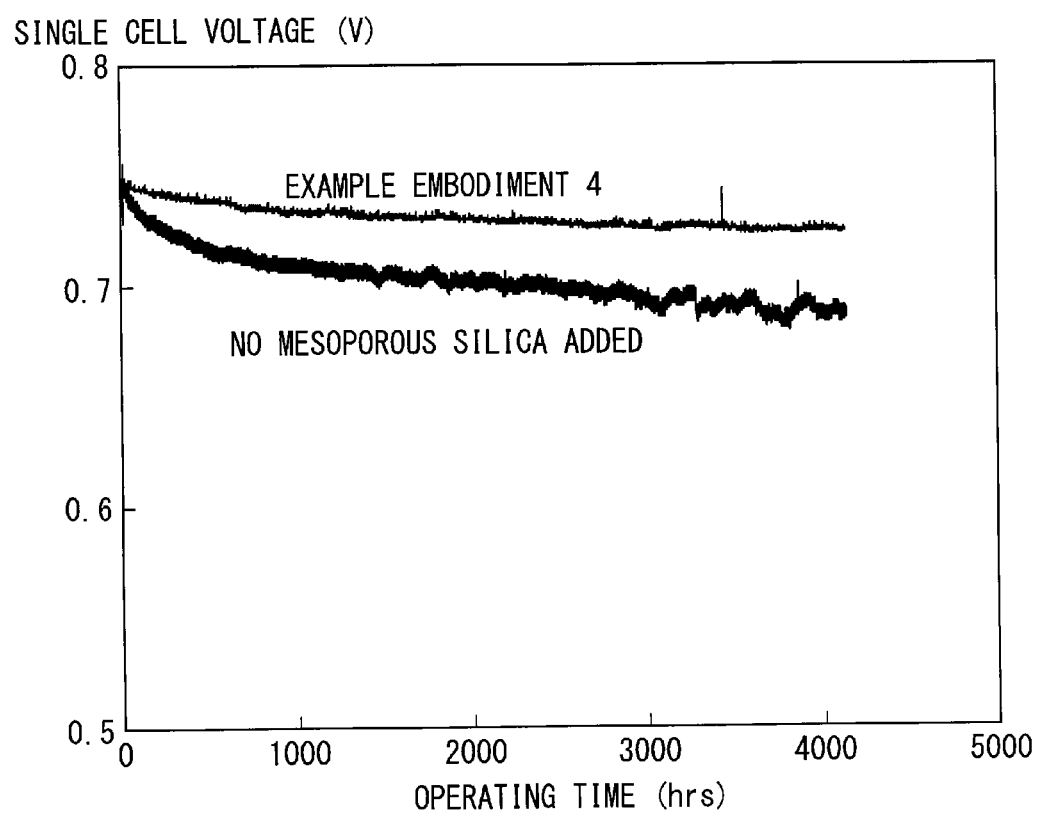
FIG. 14 is a graph showing a change in the value of single-cell voltage over operating hours, in a fourth example embodiment.

The cell voltage values (V) found in the endurance test of 4000 hours are shown in Table 4 and FIG. 14. The cell with mesoporous silica added shows a voltage drop of 0.038 V after 4000 hours, in contrast to a voltage drop of 0.067 V after 4000 hours of the cell with no mesoporous silica added. Therefore, it has been confirmed in this example embodiment that the voltage drop is reduced and that the voltage characteristics and the stability of voltage fluctuation are improved.

TABLE 4

|  | No addition | Mesoporous silica added |
|---|---|---|
| 0 hr | 0.756 | 0.763 |
| 4000 hrs | 0.689 | 0.725 |
| Voltage drop | 0.067 | 0.038 |

The fuel cell system according to the fourth example embodiment described as above uses the membrane electrode assembly 50 which has coped with and resolved the temperature fluctuation problem. Thus, the fuel cell 10 can be stably operated using the reformed gas humidified and heated by the total heat exchanger 160, without the use of the bubbler. Hence, the cost of the fuel cell system 100 can be reduced.

(Example Embodiment 5)

Figure 7:
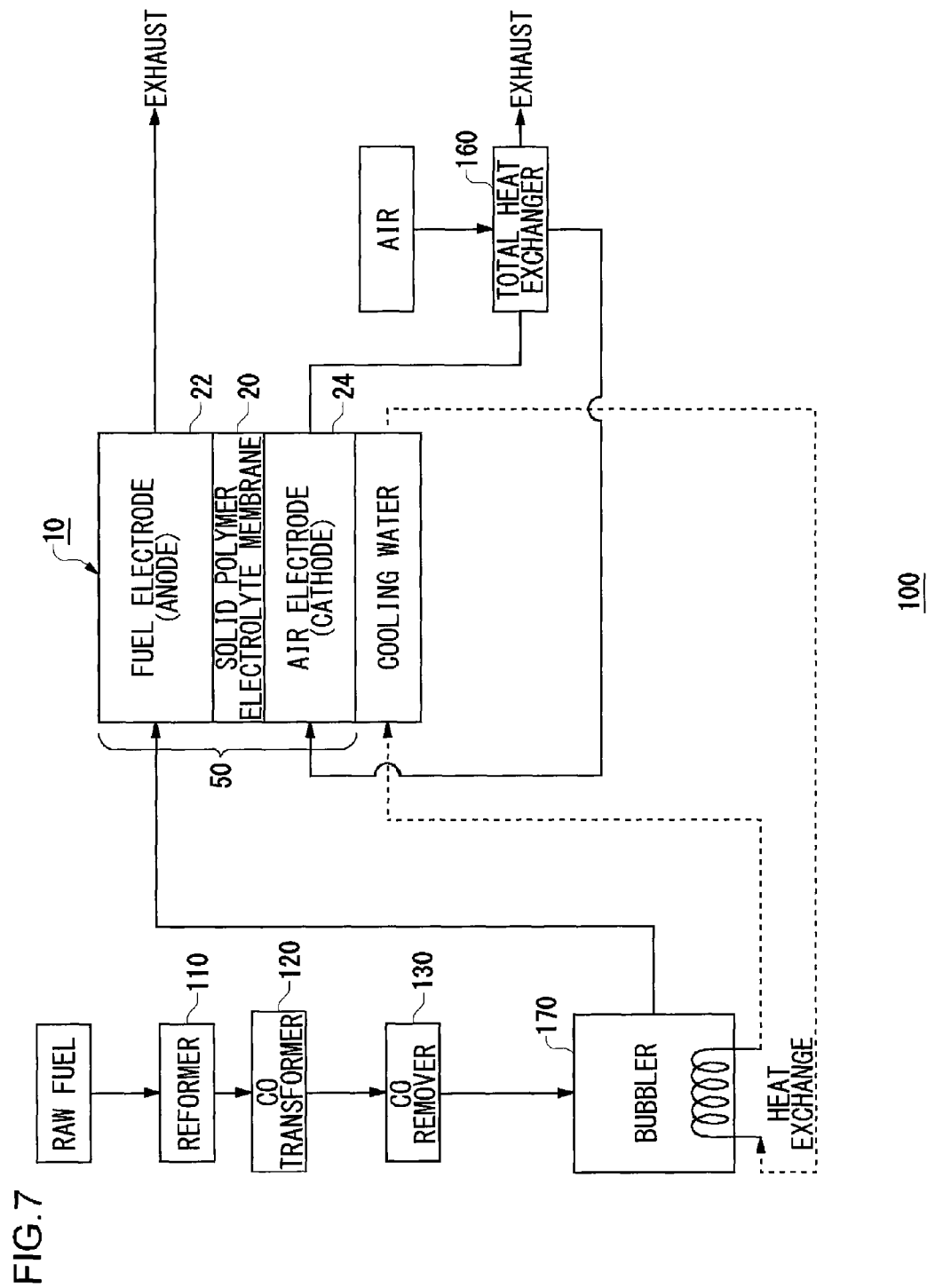
FIG. 7 is a diagram showing a schema of a fuel cell system using a membrane electrode assembly according to a fifth example embodiment.

FIG. 7 is a diagram showing a schema of a fuel cell system 100 using a membrane electrode assembly 50 according to a fifth example embodiment.

In the fifth example embodiment, the reformed gas generated in the CO reformer 130 is humidified and heated at the bubbler 170 using the cooling water discharged from the fuel cell 10, before it is supplied to the anode 22. At the same time, air humidified and heated by the total heat exchanger 160 is supplied to the cathode 24 without passing through the bubbler and used in an electrochemical reaction with hydrogen contained in the reformed gas. The reacted air is subjected to a heat exchange with unreacted air in the total heat exchanger 160 before it is released outside.

In the fuel cell system 100 of the fifth example embodiment, the humidifying temperature of the reformed gas is 5 to 1° C. below the cell temperature. In the fifth example embodiment, the fuel cell 10 is operated at the cell temperature of 85° C., so that the humidifying temperature of the reformed gas is 80 to 84° C. and the reformed gas whose relative humidity is 81 to 96% is supplied to the anode 22. The cathode 24 is humidified only by the generated water and the moving water transmitted through the solid polymer electrolyte membrane 20 from the anode 22 side. Therefore, the humidifying temperature of air supplied to the cathode 24 is 10 to 2° C. below the cell temperature. In the fifth example embodiment, the humidifying temperature of air is 75 to 83° C. and the air whose relative humidity is 53 to 75% is supplied to the cathode 24.

Figure 8:
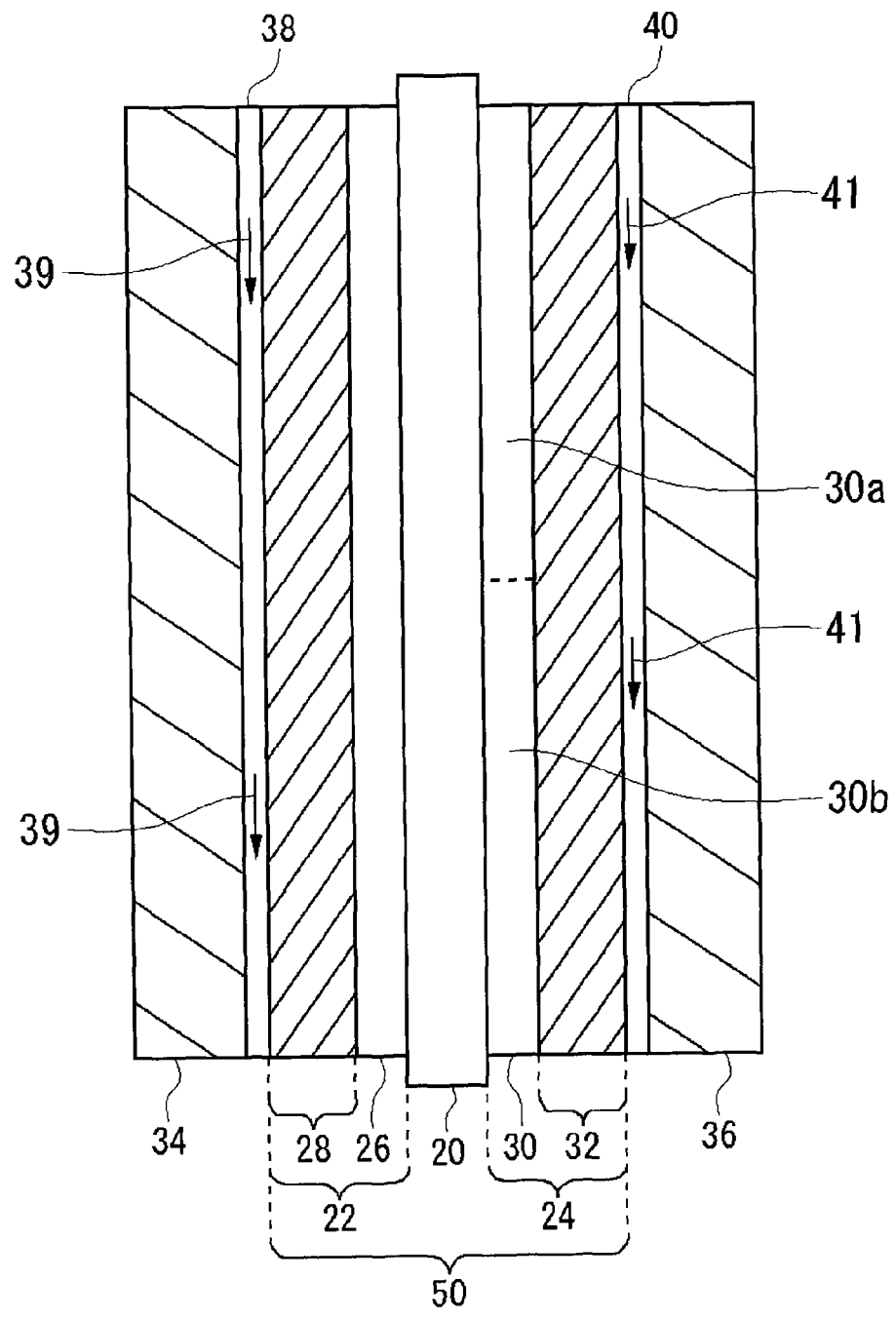
FIG. 8 is a cross-sectional view of a fuel cell having a membrane electrode assembly according to a fifth example embodiment.

FIG. 8 is a cross-sectional view of a fuel cell 10 having a membrane electrode assembly 50 according to the fifth example embodiment. The reformed gas flows through gas channels 38 in the direction of arrows 39. Air flows through gas channels 40 in the direction of arrows 41. In the fifth example embodiment, mesoporous silica was added only to the catalyst layer 30 of the cathode 24 and no mesoporous silica was added to the catalyst layer 26 of the anode 22. More specifically, mesoporous silica (TMPS-4-2, the average particle diameter: 400 nm) whose average pore diameter is 4.0 nm was added to a catalyst layer 30*a*, of the catalyst layer 30 in the cathode 24, located in a region corresponding to an upper-half (50%) flow of air on an inlet side (upstream side) thereof. The amount of TMPS-4-2 added was 3 wt. % of the total amount of catalyst, catalyst support and ion conductor of the catalyst layer 30*a*. Also, TMPS-4-2 was added to a catalyst layer 30*b*, of the catalyst layer 30 in the cathode 24, located in a region corresponding to a lower-half (50%) flow of air on an outlet side (downstream side) thereof. The amount of TMPS-4-2 added was 0.5 wt. % of the total amount of catalyst, catalyst support and ion conductor of the catalyst layer 30*b*.

Figure 15:
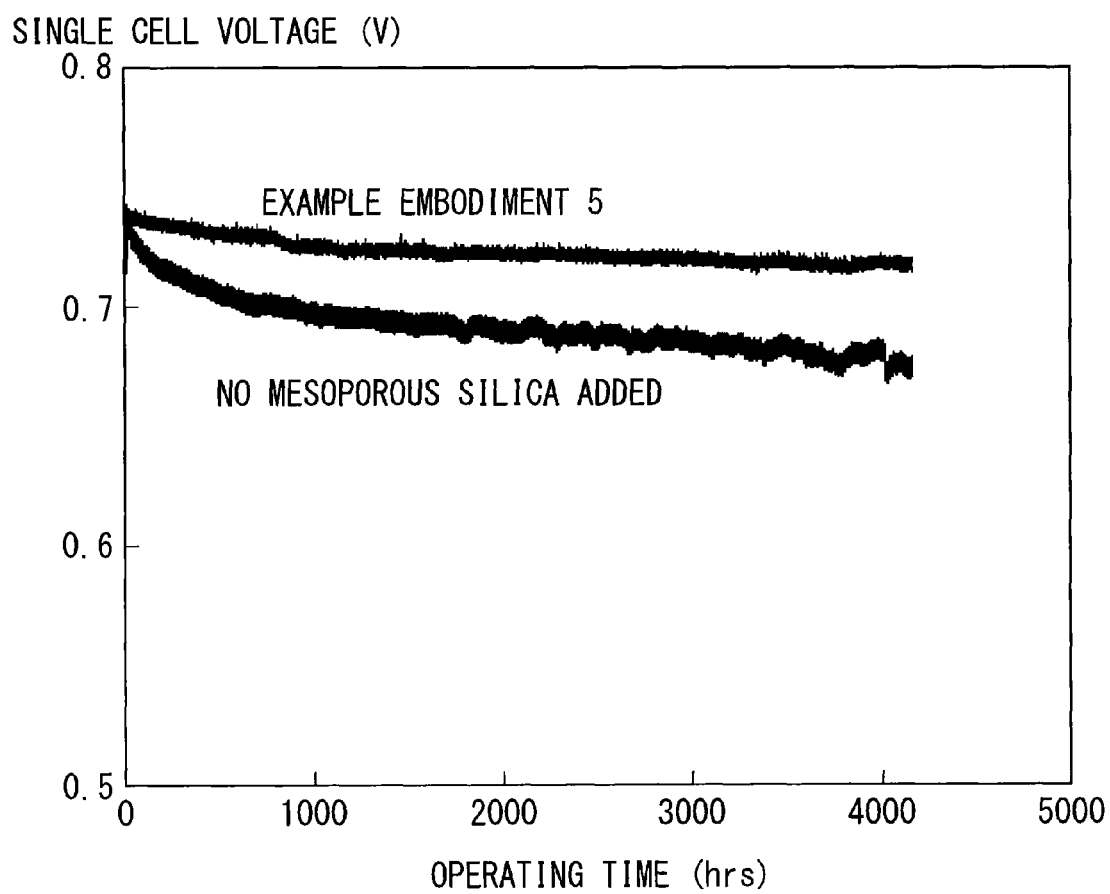
FIG. 15 is a graph showing a change in the value of single-cell voltage over operating hours, in a fifth example embodiment.

The cell voltage values (V) found in the endurance test of 4000 hours are shown in Table 5 and FIG. 15. The cell with mesoporous silica added shows a voltage drop of 0.037 V after 4000 hours, in contrast to a voltage drop of 0.059 V after 4000 hours of the cell with no mesoporous silica added. Therefore, it has been confirmed in this example embodiment that the voltage drop is reduced and that the voltage characteristics and the stability of voltage fluctuation are improved.

TABLE 5

|  | No addition | Mesoporous silica added |
|---|---|---|
| 0 hr | 0.741 | 0.753 |
| 4000 hrs | 0.682 | 0.716 |
| Voltage drop | 0.059 | 0.037 |

The fuel cell system according to the fifth example embodiment described as above uses the membrane electrode assembly 50 which has coped with and resolved the temperature fluctuation problem. Thus, the fuel cell 10 can be stably operated without the use of the bubbler or the like for humidifying the air supplied to the cathode 24. Hence, the cost of the fuel cell system 100 can be reduced.

(Example Embodiment 6)

Figure 9:
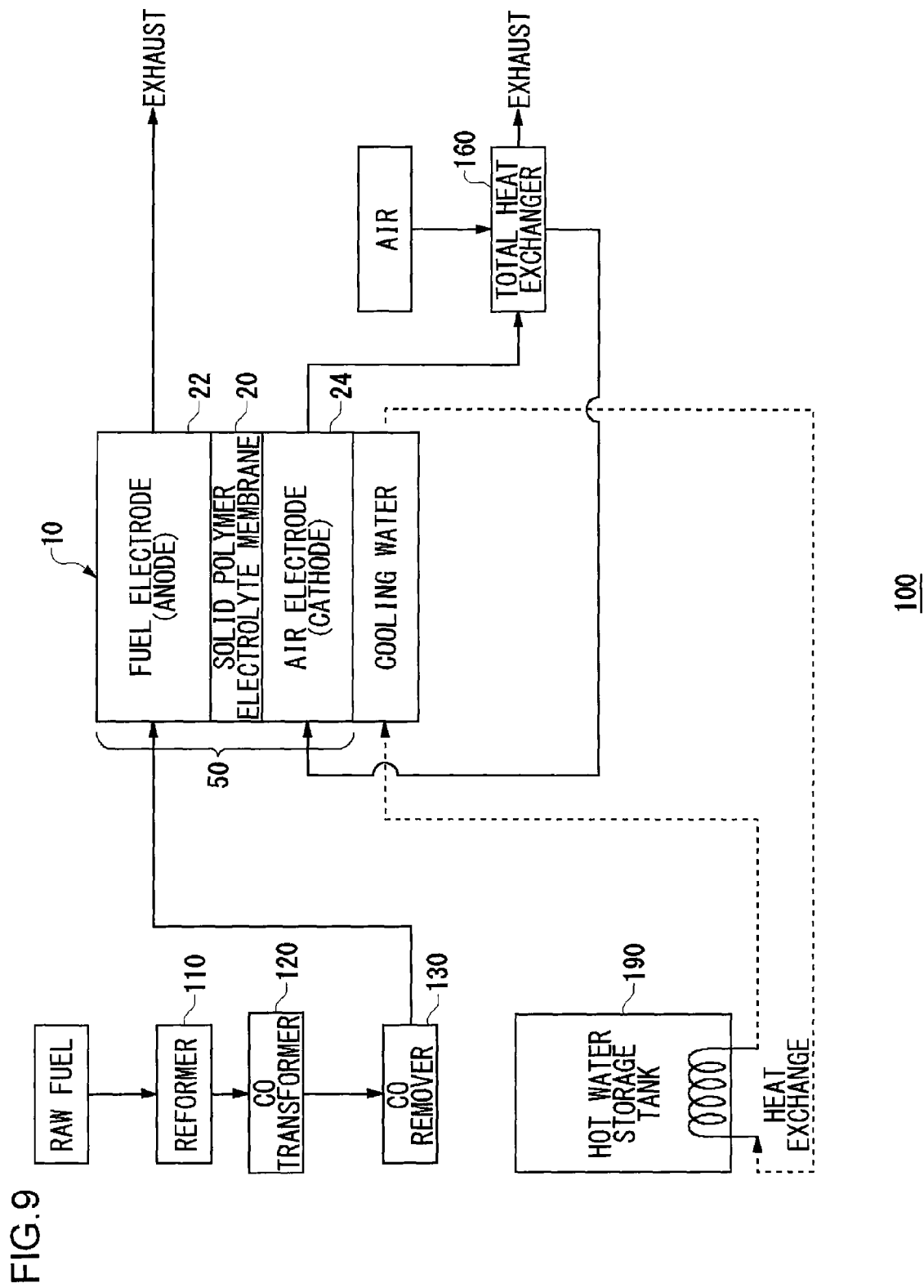
FIG. 9 is a diagram showing a schema of a fuel cell system using a membrane electrode assembly according to a sixth example embodiment.

FIG. 9 is a diagram showing a schema of a fuel cell system 100 using a membrane electrode assembly 50 according to a sixth example embodiment.

In the sixth example embodiment, the reformed gas whose CO concentration is reduced by the CO remover 130 is supplied to the fuel cell without passing through the bubbler. Similarly, the air humidified and heated by the total heat exchanger 160 is supplied to the fuel cell 10 without passing through the bubbler. The cooling water used for the cooling of cells of the fuel cell 10 is subjected to a heat exchange in a hot water storage tank 190 so as to recover the heat.

Similar to the third example embodiment, the temperature of the reformed gas fluctuated within a range of 51 to 60° C. in the fuel cell system 100 of the sixth example embodiment. Also, the humidifying temperature of air supplied to the cathode 24 is 10 to 2° C. below the cell temperature. In the sixth example embodiment, the fuel cell 10 is operated at the cell temperature of 80° C., so that the humidifying temperature of air is 70 to 78° C. and the air whose relative humidity is 27 to 41% is supplied to the anode 22 and the air whose relative humidity is 66 to 92% is supplied to the cathode 24.

Figure 10:
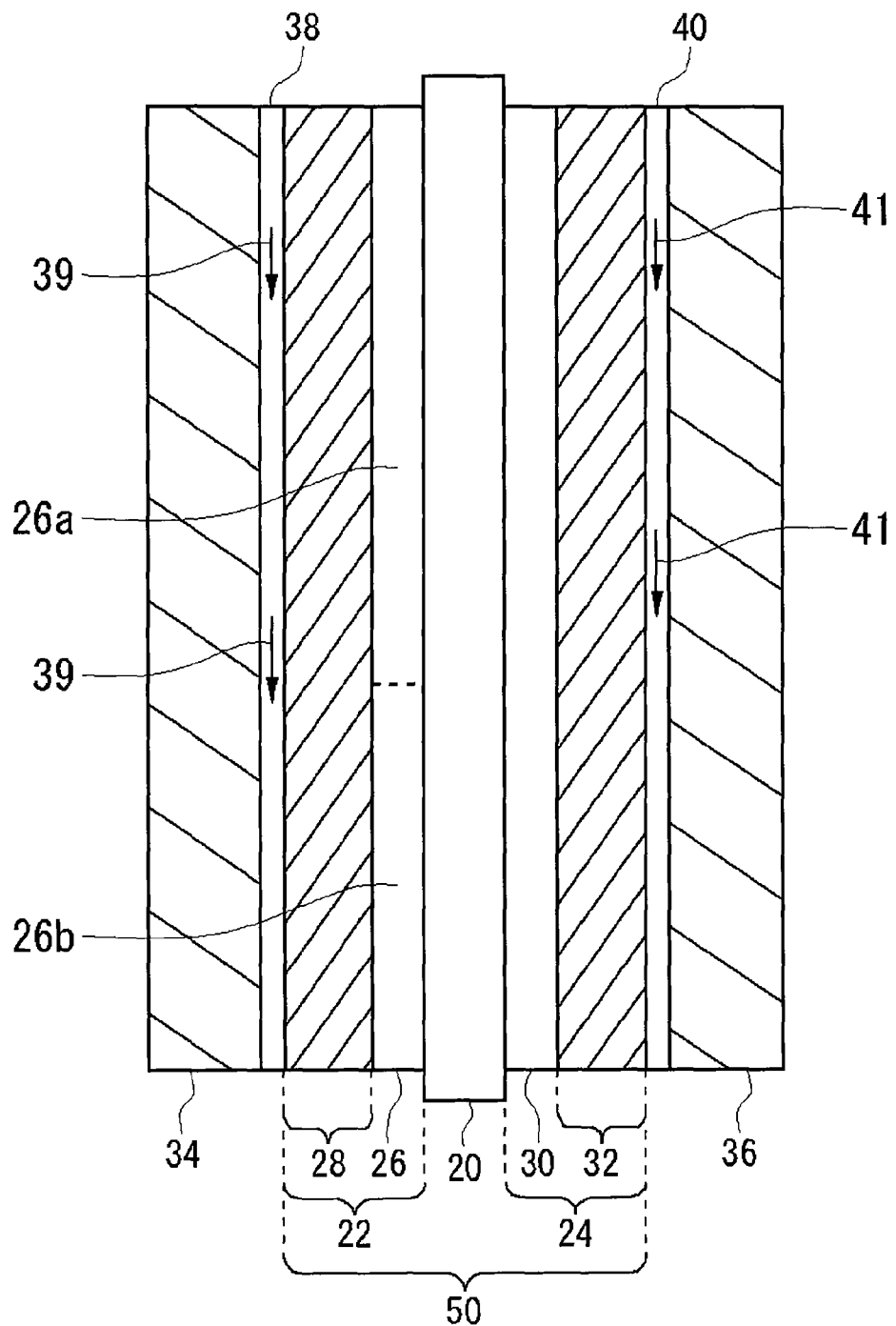
FIG. 10 is a cross-sectional view of a fuel cell having a membrane electrode assembly according to a sixth example embodiment.

FIG. 10 is a cross-sectional view of a fuel cell 10 having a membrane electrode assembly 50 according to the sixth example embodiment. Air flows through gas channels 38 in the direction of arrows 39. Air flows through the gas channels 40 in the direction of the arrows 41. In the sixth example embodiment, mesoporous silica (TMPS-1.5-2, the average particle diameter: 150 nm) whose average pore diameter is 1.5 nm was added to a catalyst layer 26a, of the catalyst layer 26 in the anode 22, located in a region corresponding to an approximately upper-half (60%) flow of the reformed gas on an inlet side (upstream side) thereof. Also, mesoporous silica (TMPS-4-2, the average particle diameter: 400 nm) whose average pore diameter is 4.0 nm was added to a catalyst layer 26b, of the catalyst layer 26 in the anode 22, located in a region corresponding to an approximately lower-half flow (40%) of the reformed gas on an outlet side (downstream side) thereof. The amount of TMPS-1.5-2 added was 8 wt. % of the total amount of catalyst, catalyst support and ion conductor of the catalyst layer 26a. Similarly, the amount of TMPS-4-2 added was 5 wt. % of the total amount of catalyst, catalyst support and ion conductor of the catalyst layer 26b. Similarly, mesoporous silica (TMPS-4-3, the average particle diameter: 200 nm) whose average pore diameter is 4.0 nm is added to the catalyst layer 30 of the cathode 24. The amount of TMPS-4-3 added to the catalyst layer 30 was 3 wt. % of the total amount of catalyst, catalyst support and ion conductor of the catalyst layer 30. In the sixth example embodiment, TMPS-4-3 is added to the entire catalyst layer 30. This is because, in the sixth example embodiment, both the anode 22 and the cathode 24 are of low humidity and therefore the amount of water moving from the cathode 24 to the anode by concentration-driven diffusion increases with the result that there a part of an outlet-side region of the cathode 24 exhibits a relative humidity of less than 100%.

Figure 16:
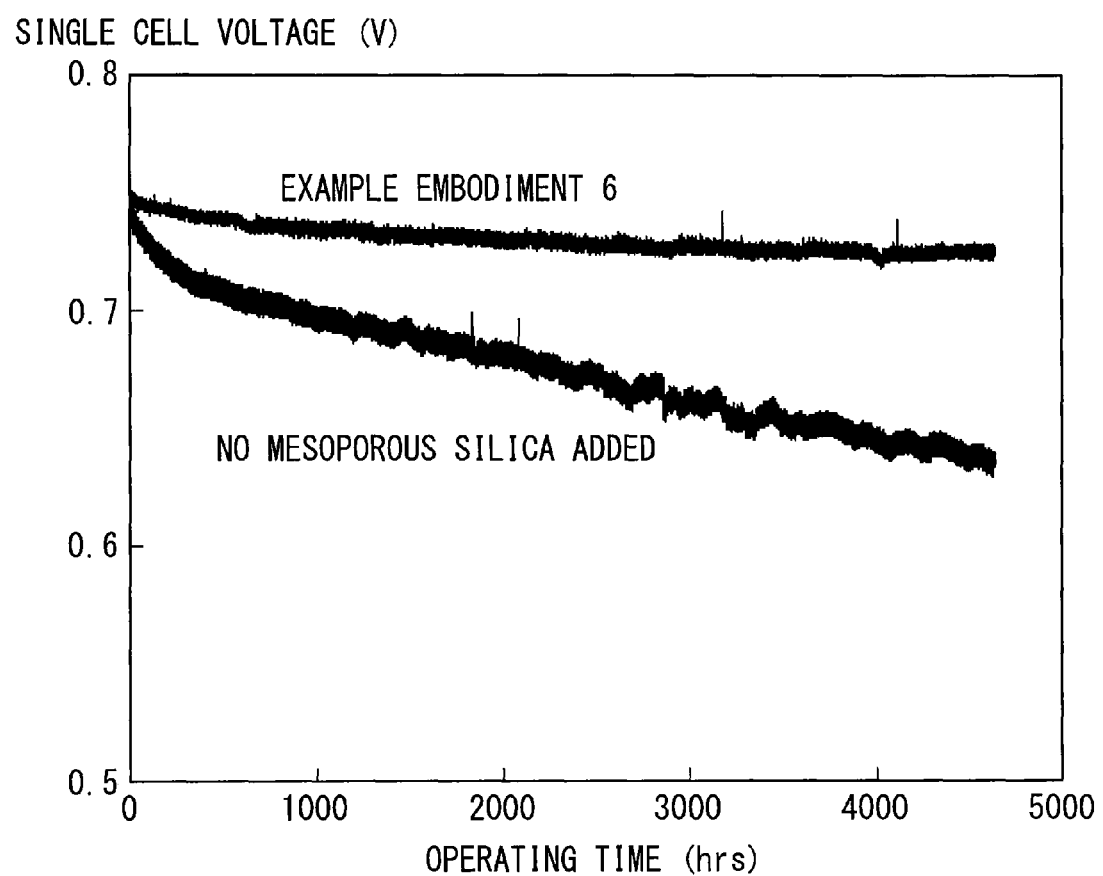
FIG. 16 is a graph showing a change in the value of single-cell voltage over operating hours, in a sixth example embodiment.

The cell voltage values (V) found in the endurance test of 4000 hours are shown in Table 6 and FIG. 16. The cell with mesoporous silica added shows a voltage drop of 0.040 V after 4000 hours, in contrast to a voltage drop of 0.115 V after 4000 hours of the cell with no mesoporous silica added. Therefore, it has been confirmed in this example embodiment that the voltage drop is reduced and that the voltage characteristics and the stability of voltage fluctuation are improved.

TABLE 6

|  | No addition | Mesoporous silica added |
|---|---|---|
| 0 hr | 0.765 | 0.766 |
| 4000 hrs | 0.650 | 0.726 |
| Voltage drop | 0.115 | 0.040 |

The fuel cell system according to the sixth example embodiment described as above uses the membrane electrode assembly 50 which has coped with and resolved the temperature fluctuation problem. Thus, the fuel cell 10 can be stably operated without the use of the bubbler for humidifying the reformed gas supplied to the anode 22 and the bubbler for humidifying the air supplied to the cathode 24. Hence, the cost of the fuel cell system 100 can be further reduced.

The present invention is not limited to the above-described embodiment and example embodiments only, and it is understood by those skilled in the art that various modifications such as changes in design may be made based on their knowledge and the embodiments added with such modifications are also within the scope of the present invention.

INDUSTRIAL APPLICABILITY

The present invention adjusts the humidity of a fuel cell without hindering the conductivity and gas diffusibility.

What is claimed is:

1. A membrane electrode assembly, comprising:
   an electrolyte membrane;
   an anode disposed on one face of said electrolyte membrane; and
   a cathode disposed on the other face of said electrolyte membrane,
   wherein:
   at least either one of the anode and the cathode has a catalyst layer containing a mesoporous humidity control agent whose amount of water adsorption rises steeply as a relative humidity increases in a predetermined relative humidity region,
   the mesoporous humidity control agent is mesoporous silica,
   a humidified reaction gas is supplied to the catalyst layer, and
   the average pore diameter of the mesoporous silica added to an upstream side of the flow of the reaction gas is smaller than the average pore diameter of the mesoporous silica added to a downstream side thereof.

2. A membrane electrode assembly according to claim 1, wherein an average pore diameter of the mesoporous silica is 1 to 15 nm.

3. A membrane electrode assembly according to claim 2, wherein
   the amount of the mesoporous silica, added to an upstream side of the flow of the reaction gas, relative to the catalyst layer on an upstream side is larger than the amount of the mesoporous silica, added to a downstream side of the flow of the reaction gas, relative to the catalyst layer on a downstream side.

4. A fuel cell having a membrane electrode assembly according to claim 2.

5. A fuel cell having a membrane electrode assembly according to claim 1.

* * * * *